(12) United States Patent
Langer

(10) Patent No.: US 6,377,131 B1
(45) Date of Patent: Apr. 23, 2002

(54) PULSE WIDTH MODULATED DRIVER

(75) Inventor: Peter Langer, Lexington, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/691,401

(22) Filed: Oct. 18, 2000

(51) Int. Cl.[7] .............................................. H03K 7/08
(52) U.S. Cl. ...................................................... 332/109
(58) Field of Search ......................... 307/106; 327/108, 327/178, 538, 540; 318/599; 332/109, 110; 323/282, 283; 363/21.11

(56) References Cited

U.S. PATENT DOCUMENTS

| | | | | |
|---|---|---|---|---|
| 5,457,435 A | * | 10/1995 | Hoffman | 332/110 |
| 5,721,511 A | * | 2/1998 | Lee | 327/540 |
| 5,936,446 A | * | 8/1999 | Lee | 327/172 |
| 5,994,973 A | * | 11/1999 | Toki | 332/109 |

* cited by examiner

Primary Examiner—Adolf Deneke Berhane
(74) Attorney, Agent, or Firm—John F. Buckert; Allan Lippa

(57) ABSTRACT

A pulse width modulated driver 20 is provided for driving a load 17, such as a halogen bulb, at a reduced voltage level. The driver 20 includes a switch 28 selectively opening and closing to apply a pulse width modulated signal $V_{PWM}$ to a high voltage end of the load 17. The switch 28 operates responsive to a switch control signal $V_S$. The driver 20 further includes a duty cycle control circuit 26 generating the switch control signal $V_S$ when an input operational voltage $V_o$ is above a threshold voltage level. Finally, the driver includes an energy storage circuit 24 for storing electrical energy when the switch 28 is open to maintain the input operational voltage $V_o$ above the threshold voltage level. The driver 20 is connected on a high side of the load 17 and does not require a separate line connected to system ground.

21 Claims, 4 Drawing Sheets

PULSE WIDTH MODULATED DRIVER

FIELD OF THE INVENTION

This invention relates to a pulse width modulated driver, and particularly, to a high side pulse width modulated driver for driving a load at a reduced voltage level.

BACKGROUND OF THE INVENTION

Automotive manufacturers are currently designing automotive vehicles having 42 Vdc electrical systems in addition to conventional 12 Vdc electrical systems. Several advantages are obtained by utilizing 42 Vdc electrical systems. In particular, the 42 Vdc electrical systems may utilize a smaller gauge (i.e., diameter) of wire—as compared with 12 Vdc electrical systems—because the increased voltage allows for a lower current flow through the wire. The reduced wire gauge also results in reduced weight and wire cost for an automotive vehicle.

A problem exists, however, with using a 42 Vdc supply voltage to drive a conventional halogen bulb in an automotive headlamp assembly. In particular, the conventional halogen bulbs (typically used in 12 Vdc electrical systems) have filaments that burn out relatively quickly when 42 Vdc is applied across the filaments. Specially designed halogen bulbs with longer and/or thinner filaments would need to be designed for the increased voltage level. However, these specially designed halogen bulbs would be more expensive and less robust as conventional halogen bulbs and would thus increase the cost of automotive vehicles and warranty.

When utilizing 42 Vdc electrical systems, pulse width modulated drivers have been utilized to drive the halogen bulbs at reduced voltage levels. Referring to FIG. 1, a conventional control circuit 10 using a conventional pulse width modulated driver 13 is shown. The driver 13 is utilized to drive a load 17, such as a halogen bulb. The driver 13 includes terminals 14, 15, 16. As illustrated, the driver 13 is connected to the normally-open switch 12 via the terminal 14. The driver 13 receives the supply voltage $V_{CC}$, which may be 42 Vdc, when the switch 12 is closed. The driver 13 is further connected to a system ground via a terminal 15. Finally, the driver 13 is connected to the load 17 via the terminal 16. During operation, the driver 13 generates an output voltage that is applied to the load 17.

A disadvantage of the conventional driver 13 is that a separate ground line connected to the terminal 15 is required for its operation. When the driver 13 is located in an automotive vehicle at a relatively large distance from the system ground, a line must nevertheless be routed between the terminal 15 and the system ground. One skilled in the art will recognize that when a plurality of drivers 13 are utilized in an automotive vehicle, an additional ground line for each driver 13 will substantially increase the manufacturing costs of an automotive vehicle. Further, the amount of space utilized by the ground lines will decrease the amount of space available for additional automotive components.

There is thus a need for a pulse width modulated driver and a method related thereto that minimizes or reduces one or more of the above-mentioned deficiencies.

SUMMARY OF THE INVENTION

The present invention provides a high side pulse width modulated driver for driving a load, such as a halogen bulb.

The pulse width modulated driver in accordance with the present invention includes a switch selectively opening and closing to apply a pulse width modulated signal to the load. In particular, the switch opens and closes responsive to a switch control signal. The switch may comprise a transistor, and in particular, may comprise a MOSFET transistor. The driver further includes a duty cycle control circuit that generates the switch control signal when an input operational voltage is above a threshold voltage level. The duty cycle control circuit includes an oscillator. Finally, the driver includes an energy storage circuit for storing electrical energy when the switch is open to maintain the input operational voltage above the threshold voltage level. During operation, the inventive driver may receive a 42 Vdc supply voltage and generate an output voltage of approximately 12 Vdc (RMS) for driving a conventional halogen bulb.

A method for energizing a load, such as a halogen bulb, in accordance with the present invention is also provided. To implement the method, the load and a switch are connected in series between a supply voltage and system ground. The inventive method includes selectively opening and closing the switch to apply a pulse width modulated signal to the load responsive to a switch control signal. The method further includes generating the switch control signal using a duty cycle control circuit when the input operational voltage is above a threshold voltage level. Finally, the method includes charging a capacitor when the switch is open to maintain the input operational voltage above the threshold voltage level.

The pulse width modulated driver and the method related thereto in accordance with the present invention represents a significant improvement over conventional drivers and methods. In particular, when the inventive driver is utilized as a high side voltage driver (i.e., when the load is connected between the driver and system ground), the driver does not require a separate electrical line connected to system ground. In other words, the driver operates at a floating voltage potential with respect to system ground. One skilled in the art will recognize that an automotive vehicle may have a plurality of loads, such as halogen bulbs, each being controlled by a dedicated driver. Since each inventive driver can operate without a separate ground line, the number of electrical lines in an automotive vehicle may be greatly reduced. As a result, the inventive driver allows for decreased wiring and manufacturing costs associated with an automotive electrical system. Further, the inventive driver allows for decreased wiring space being utilized in an automotive vehicle since a ground line is not needed. Thus, an increased amount of space is available for other automotive components. Further, because the inventive driver may generate an output voltage of approximately 12 Vdc (RMS), the driver may control a conventional halogen bulb without decreasing the operational life of the bulb.

These and other features and advantages of this invention will become apparent to one skilled in the art from the following detailed description and the accompanying drawings illustrating features of this invention by way of example.

DETAILED DESCRIPTION OF THE PREFERRED EMBODIMENTS

Figure 1:
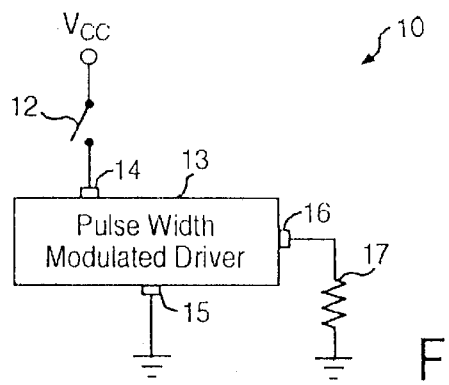
FIG. 1 is a schematic and block diagram illustrating a control circuit utilizing a conventional pulse width modulated driver to energize a load.
Figure 2:
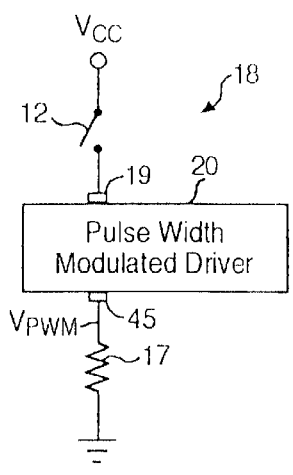
FIG. 2 is a schematic and block diagram illustrating a control circuit in accordance with a first embodiment of the present invention utilizing an inventive pulse width modulated driver.

Referring now to the drawings wherein like reference numerals are used to identify identical components in the various views, FIG. 2 illustrates a control circuit 18 for energizing a load 17, such as a conventional halogen bulb. The circuit 18 may include a normally-open switch 12 connected in series with an inventive pulse width modulated driver 20. The driver 20 is further connected in series to the load 17.

The switch 12 is provided to connect or disconnect a supply voltage $V_{CC}$ to the pulse width modulated driver 20. The switch 12 is conventional in the art and may comprise a headlamp switch in an automotive vehicle (not shown). As illustrated, the switch 12 may be electrically connected in series between the supply voltage $V_{CC}$ and the driver 20. When the switch 12 is closed, the driver 20 receives the supply voltage $V_{CC}$. In a constructed embodiment, the supply voltage $V_{CC}$ is approximately 42 Vdc. It should be understood, however, that the circuit 18 may operate with a supply voltage $V_{CC}$ greater than or less than 42 Vdc.

The pulse width modulated driver 20 may be provided to generate a pulse width modulated signal $V_{PWM}$ that provides a power level about equal to a power level provided by a DC supply voltage. In particular, the driver 20 may generate the signal $V_{PWM}$ utilizing a 42 Vdc supply voltage to drive a halogen bulb 17 at a power level equivalent to a 12 Vdc supply voltage. The following equation may be utilized to determine the duty cycle of the signal $V_{PWM}$ utilizing a supply voltage $V_{CC}$ to supply a power level equal to an N Vdc supply voltage:

$$\text{Duty cycle} = ((N)^2/(V_{CC})^2 * 100)$$

Figure 3:
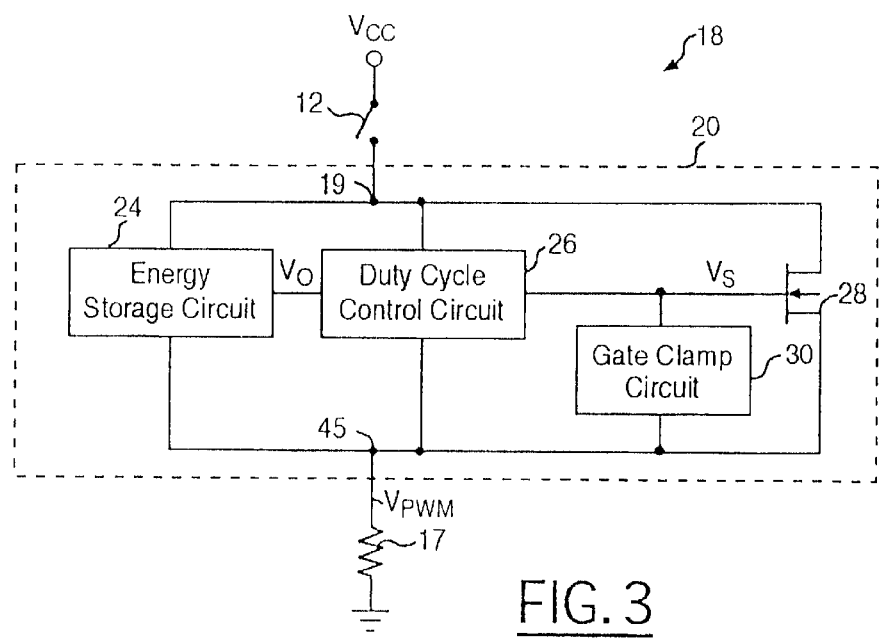
FIG. 3 is a schematic and block diagram illustrating of the control circuit shown in FIG. 2 and the major components of the pulse width modulated driver.

Therefore, if the supply voltage $V_{CC}$ is equal to 42 Vdc and N is equal to 12 Vdc, the duty cycle of signal $V_{PWM}$ would be 8% (duty cycle=$((12)^2/(42)^2*100)$=8%). However, the driver 20 may be utilized with a supply voltage $V_{CC}$ greater than or less than 42 Vdc. Referring to FIG. 3, the driver 20 may be utilized as a high-side driver wherein the driver 20 is connected to the high voltage end of the load 17. As such, the driver 20 operates at a floating voltage potential with respect to the system ground. The driver 20 may include an energy storage circuit 24, a duty cycle control circuit 26, a switch 28, a gate clamp circuit 30, an input terminal 19, and an output terminal or node 45.

Figure 4:
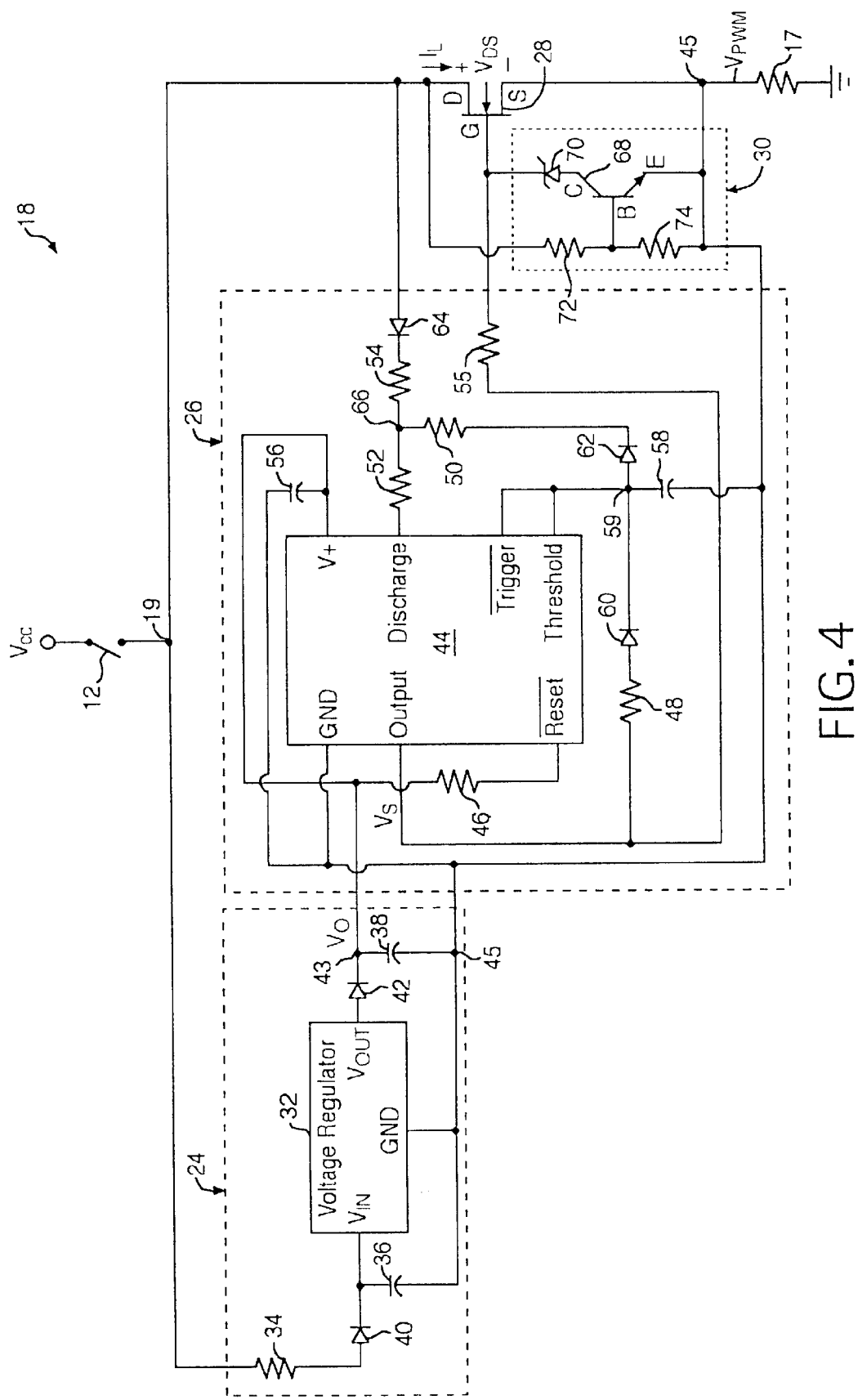
FIG. 4 is an electrical schematic illustrating the control circuit shown in FIG. 3.

The energy storage circuit 24 is provided to maintain an operational voltage $V_o$ for the duty cycle control circuit 26, above a threshold voltage level. In a constructed embodiment, the threshold voltage level is approximately 5 Vdc with reference to the floating voltage at node 45. As illustrated, the energy storage circuit 24 receives the supply voltage $V_{CC}$ when the switch 12 is closed and generates the operational voltage $V_o$ responsive to the voltage $V_{CC}$. Referring to FIG. 4, the circuit 24 may include a voltage regulator 32, a resistor 34, capacitors 36, 38, and diodes 40, 42.

The voltage regulator 32 is provided to output an operational voltage $V_o$ for operation of the duty cycle control circuit 26. The voltage regulator 32 is conventional in the art and may have an $V_{IN}$ pin, a $V_{OUT}$ pin, and a GND pin. The $V_{IN}$ pin is connected to a series combination of the resistor 34 and the diode 40. The resistor 34 limits the amount of current flowing from the supply voltage $V_{CC}$ into the capacitor 36. Further, the diode 40 prevents current from flowing in an opposite direction through the resistor 34 to the supply voltage $V_{CC}$. As illustrated, the GND pin is connected to a node 45 with a capacitor 36 connected between the node 45 and the $V_{IN}$ pin. Further, the GND pin is at a floating voltage potential with respect to the system ground. The capacitor 36 is provided to protect the voltage regulator 32 from transient voltage spikes at the $V_{IN}$ pin and to stabilize the voltage at the $V_{IN}$ input pin. As shown, the $V_{OUT}$ pin is connected to a diode 42 with a cathode terminating at a node 43. Further, a capacitor 38 is connected between the node 43 and the node 45. Further, the diode 42 prevents current from flowing into the voltage regulator 32 thus protecting the regulator 32. In particular, the diode 42 prevents the capacitor 38 from discharging through the regulator 32. The diode 42 may comprise a separate component or may be integrated into the voltage regulator 32.

As previously discussed, when the switch 12 closes, the voltage generator 32 generates an operational voltage $V_o$. Subsequently, when the pulse width modulated signal $V_{PWM}$ applied to the node 45 and to the load 17, transitions to a low voltage level, the capacitor 38 charges resulting in an increased voltage potential across the capacitor 38. The voltage potential across the capacitor 38 corresponds to the operational voltage $V_o$.

Figure 7A:
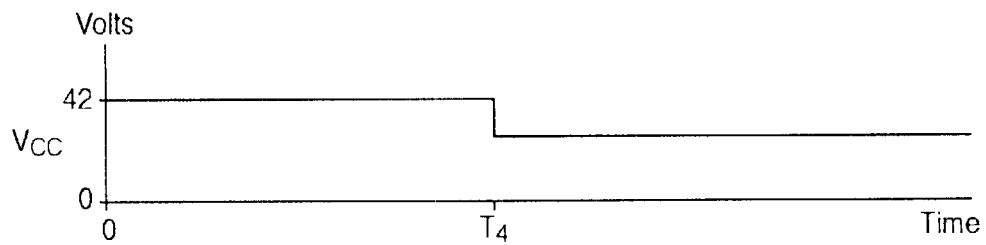
FIGS. 7A–E are timing diagrams illustrating voltage levels for signals within the control circuit of FIG. 4.
Figure 7B:
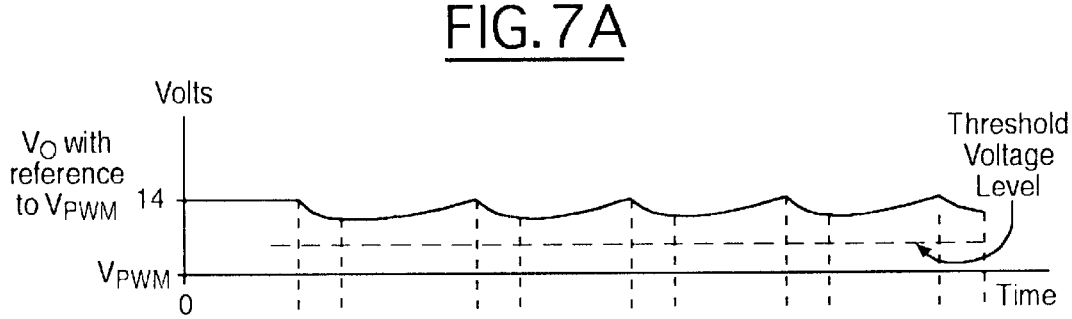
Figure 7C:
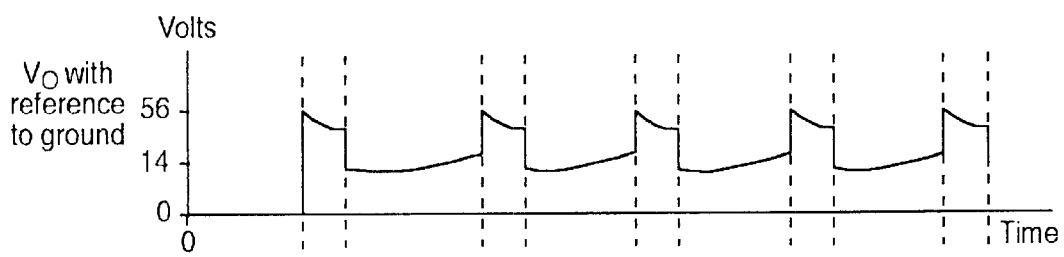
Figure 7D:
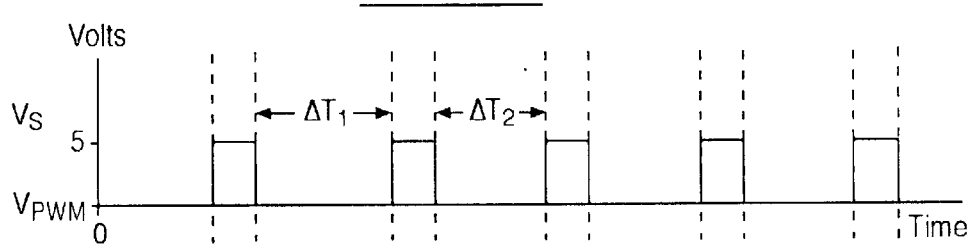
Figure 7E:
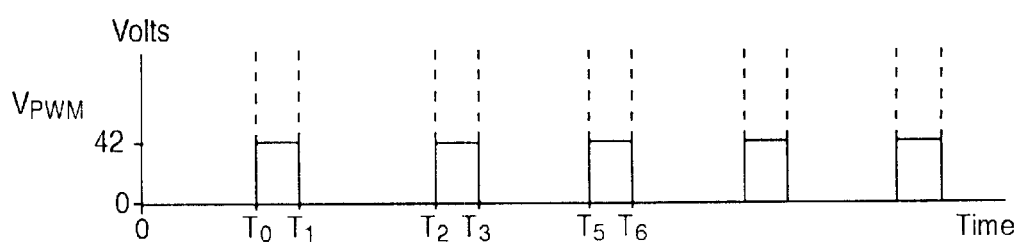

Referring to FIG. 7B, immediately prior to time $T_0$, capacitor 38 has voltage potential of 14 Vdc (with respect to the signal $V_{pwm}$). Referring to FIGS. 7C and 7E, at time $T_0$, the signal $V_{pwm}$—applied to the node 45—transitions from a low voltage level (0 Vdc) to a high voltage level (42 Vdc) Thus, the voltage at node 45 floats with respect to system ground. Referring to FIG. 7C, at time $T_0$, the operational voltage $V_o$ at node 43 correspondingly increases from 14 Vdc (with respect to system ground) to 56 Vdc. Thus, the circuit 24 behaves like a charge pump since increasing the voltage level at node 45 of the capacitor 38 results in a corresponding voltage increase at node 43 of the capacitor 38. Referring to FIGS. 7B and 7E, in response to the voltage increase at node 45 to 42 Vdc, the capacitor 38 discharges current through the duty cycle control circuit 26 to the system ground between time $T_0$ and $T_1$. In other words, the capacitor 38 discharges current when the load 17 is being energized. However, as illustrated in FIG. 7B, the operational voltage $V_o$ does not decrease lower than a threshold voltage level required for operation of the circuit 26. Referring to FIGS. 7C and 7E, at time $T_1$, the pulse width modulated signal $V_{PWM}$ applied to the node 45 (and to the load 17) transitions from a high voltage level (42 Vdc) to a low voltage level (0 Vdc). In response, the operational voltage $V_o$ at node 43 corresponding decreases from approximately 56 Vdc to approximately 14 Vdc. Decreasing the voltage level at node 45 of the capacitor 38 results in a corresponding voltage decrease at node 43 of the capacitor 38. Referring to FIGS. 7B and 7E, in response to the voltage decrease at node 45 to 0 Vdc, the capacitor 38 stores charge which thereby increases the voltage $V_o$ across the capacitor 38 between times $T_1$ and $T_2$. In other words, the capacitor 38 charges when the load 17 is not being energized to maintain the operational voltage $V_o$ above a threshold operational voltage level.

Referring to FIG. 3, a duty cycle control circuit 26 is provided to generate a switch control signal $V_S$ to control a switch 28. The circuit 26 receives the operational voltage $V_o$ from the energy storage circuit 24. When the operational voltage $V_o$ is above a threshold voltage level (necessary for operation of the circuit 26), the circuit 26 generates the switch control signal $V_S$. In response to the signal $V_S$, the switch 28 selectively opens and closes to apply the pulse width modulated signal $V_{PWM}$ to the load 17. Referring to FIG. 4, the duty cycle control circuit 26 may include an oscillator 44, resistors 46, 48, 50, 52, 54, 55, capacitors 56, 58, and diodes 60, 62, 64.

The oscillator 44 is provided to generate the switch control signal $V_S$. The oscillator 44 is conventional in the art and may comprise a LMC555 CMOS timer manufactured by National Semiconductor at 2900 Semiconductor Drive, Santa Clara, Calif. One skilled in the art will recognize that various oscillator chips and/or circuits could be used instead of the LMC555 CMOS timer. As illustrated, the oscillator 44 includes a GND pin, a V+pin, a RESET pin, a TRIGGER pin, a THRESHOLD pin, a DISCHARGE pin, and an OUTPUT pin.

Referring again to FIG. 4, the V+pin of the oscillator 44 is connected to the node 43 of the energy storage circuit 24. Thus, the V+pin receives the operational voltage $V_o$ from the circuit 24. The RESET pin is also connected to node 43 through a resistor 46 to allow for astable operation of the oscillator 44. The V+pin is further connected through a capacitor 56 to the node 45 to protect (decouple) the oscillator 44 from voltage spikes at the V+pin. The GND pin is connected to the node 45 which has a voltage potential that floats with respect to system ground. The OUTPUT pin is connected to a resistor 55 that is further connected to the gate G of the switch 28. Further, the OUTPUT pin transmits the switch control signal $V_S$ to the switch 28 to control the operation of the switch 28. The OUTPUT pin is further connected through a series combination of the resistor 48 and the diode 60. The diode 60 has a cathode that terminates at a node 59. Accordingly, the diode 60 prevents current from flowing into the OUTPUT pin, wherein the diode 60 is used only for the charging of the capacitor 58. The node 59 is connected to the THRESHOLD pin and to the TRIGGER pin of the oscillator 44. The TRIGGER pin is utilized to iteratively retrigger the oscillator 44 to control the duty cycle of the switch control signal $V_S$ which will be discussed in greater detail below. The node 59 is further connected via a capacitor 58 to the node 45. The capacitor 58 is a timing capacitor for the oscillator 44. The node 59 is further connected to a series combination of the diode 62 and the resistor 50 which terminates at a node 66. The DISCHARGE pin is connected to the resistor 52 which terminates at the node 66. Finally, a series combination of the resistor 54 and the diode 64 is connected between the node 66 and the terminal 19.

When the oscillator 44 receives an operational voltage $V_o$ greater than a threshold operational voltage level, the oscillator 44 generates the switch control signal $V_S$. In particular, the oscillator 44 is internally configured to generate a switch control signal $V_S$ at a low voltage level when a voltage level at the THRESHOLD pin (node 59) is greater than ⅔ of the supply voltage $V_{CC}$. Alternately, the oscillator 44 generates a switch control signal $V_S$ at a high voltage level (e.g., between 5–14 Vdc with respect to $V_{PWM}$) when the voltage level at the THRESHOLD pin is less than ⅓ of the supply voltage $V_{CC}$. Thus, the switch control signal $V_S$ toggles between a high voltage level and a low voltage level responsive to the voltage across the capacitor 58 as described in greater detail below.

When the switch control signal $V_S$ is at a high voltage level (e.g., between 5–14 Vdc with respect to $V_{PWM}$), current flows through the resistor 48 and the diode 60 to charge the capacitor 58. When the voltage potential across the capacitor 58 is greater than ⅔ of the supply voltage $V_{CC}$, the oscillator 44 transitions the switch control signal $V_S$ to a low voltage level and internally grounds the DISCHARGE pin. In response, the capacitor 58 discharges current through the diode 62, the resistor 50, and the resistor 52. Thus, the resistors 50, 52, 54 control the discharge rate of the capacitor 58 which controls the time duration that the switch control signal $V_S$ (and the signal $V_{PWM}$) is at a low voltage level. The resistance values of the resistors 50, 52, 54 may be empirically determined by those skilled in the art. Thereafter, when the voltage potential across the capacitor 58 is less than ⅓ of the supply voltage $V_{CC}$, the oscillator transitions the switch control signal $V_S$ to a high voltage level and internally opens the DISCHARGE pin. Thus, current flows through the resistor 48 and the diode 60 to charge the capacitor 58. Thus, the resistor 48 controls the charge rate of the capacitor 58 which controls the time duration that the switch control signal $V_S$ (and the signal $V_{PWM}$) is at a high voltage level. As illustrated, the switch control signal $V_s$ is applied through the resistor 55 to the gate G of the transistor 28.

In an automotive vehicle (not shown), the supply voltage $V_{CC}$ may decrease or increase from a desired voltage level, such as 42 Vdc. However, it is desirable to maintain the pulse width modulated signal $V_{PWM}$ at a relatively constant RMS voltage level even if the supply voltage $V_{CC}$ increases or decreases. To accomplish this task, the duty cycle control circuit 44 is configured to adjust the duty cycle of the switch control signal $V_S$ responsive to the voltage level of the supply voltage $V_{CC}$. In particular, the circuit 44 is configured to increase or decrease the time duration that the switch control signal $V_S$ is at a low voltage level responsive to the voltage level of the supply voltage $V_{CC}$—which decreases or increases the duty cycle of the switch control signal $V_S$ respectively.

Referring to FIG. 4, one skilled in the art will recognize that when the voltage level at node 66 is increased (by an increased $V_{CC}$), the discharge time of the capacitor 58 through resistors 50, 52 will also be increased. Further, when the discharge time of the capacitor 58 is increased, the time duration that the switch control signal $V_S$ is at a low voltage level is also increased. Accordingly, an increased $V_{CC}$ will result in a decreased duty cycle of the signal $V_S$. (duty cycle=time duration that $V_S$ is at a high voltage value/time duration that $V_S$ is at a low voltage value).

One skilled in the art will also recognize that when the voltage level at node 66 is decreased (by a decreased $V_{CC}$), the discharge time of the capacitor 58 through resistors 50, 52 will be decreased. Further, when the discharge time of the capacitor 58 is decreased, the time duration that the switch control signal $V_S$ is at a low voltage level is also decreased. Accordingly, a decreased $V_{CC}$ will result in a increased duty cycle of the switch control signal $V_S$ and correspondingly to an increased duty cycle of the pulse width modulated signal $V_{PWM}$. As shown in FIGS. 7A and 7E, prior to time $T_4$, the supply voltage $V_{CC}$ is equal to 42 Vdc and the switch control signal $V_S$ is at a low voltage level for a time duration $\Delta T_1$.

At time $T_4$, the supply voltage $V_{CC}$ decreases below 42 Vdc and the switch control signal $V_S$ is at a low voltage level for a time duration $\Delta T_2$. As shown, the off time duration $\Delta T_2$ is less than the off time duration $\Delta T_1$. Thus, a decrease in the supply voltage $V_{CC}$ results in an increased duty cycle of the switch control signal $V_S$.

Referring to FIGS. 3 and 4, the switch 28 is provided to selectively open and close to apply the pulse width modulated signal $V_{PWM}$ to the load 17. The switch 28 may comprise a conventional field effect transistor (FET) having a gate G, a drain D, and a source S. It should be understood, however, that the switch 28 may alternately comprise a bipolar junction transistor or other controllable switches known by those skilled in the art. As illustrated, the drain D is connected to the terminal 19, the source S is connected to the load 17, and the gate G is connected to the resistor 55 which is further connected to the OUTPUT pin of the oscillator 44. When the switch control signal $V_S$ is greater than a "turn on" voltage (i.e., $V_S > 5$ Vdc with respect to signal $V_{PWM}$) of the transistor 28, the transistor 28 closes (conducts) allowing the current $I_L$ to energize the load 17. Alternately, when the switch control signal $V_S$ is less than the "turn on" voltage of the transistor 28, the transistor 28 opens which de-energizes the load 17. It should be understood that the pulse width modulated signal $V_{PWM}$ is generated by the switch 28 closing and opening to control the flow of current $I_L$ into the load 17.

Referring to FIGS. 3 and 4, the gate clamp circuit 30 is provided to limit the current $I_L$ flowing through the source S and drain D of the transistor 28. When the load 17 is turned on, the current $I_L$ is equal to an inrush current value that is substantially greater than a steady state current value. For example, the inrush current value may be ten times greater than the steady state current value. During this time, it is preferable to limit the current $I_L$ to a predetermined current value to prevent a filament (not shown) in the halogen bulb 17 from being damaged. In particular, the gate clamp circuit 30 limits the voltage level of the switch control signal $V_S$ to a predetermined voltage level to thereby limit the current $I_L$. As illustrated, the gate clamp circuit 30 includes a transistor 68, a zener diode 70 and resistors 72, 74.

The transistor 68 is provided to "turn on" when the voltage across the source S and drain D of the transistor 28 is above a predetermined voltage level indicative of a current $I_L$ at an inrush current value. The collector C of the transistor 68 is connected to the zener diode 70 which is further connected to the gate G of the transistor 28 The emitter E of the transistor 68 is connected to the source S of the transistor 28. The base B of the transistor 28 is connected between resistors 72, 74, respectively, which are connected in series between the drain D and source S, respectively, of the transistor 28. When the voltage $V_{DS}$ is greater than a predetermined voltage level—indicative of $I_L$ being equal to an inrush current value—the resistors 72, 74 divide the voltage $V_{DS}$ such that the voltage across the resistor 74 is sufficient to "turn on" the transistor 68. Accordingly, the switch control signal $V_S$ is effectively clamped at a voltage level equal to the sum of the voltage across the zener diode 70 and the voltage across the collector C and emitter E of the transistor 68. Thus, the current $I_L$ is limited to a predetermined threshold current value during the initial energization of the load 17.

Figure 8:
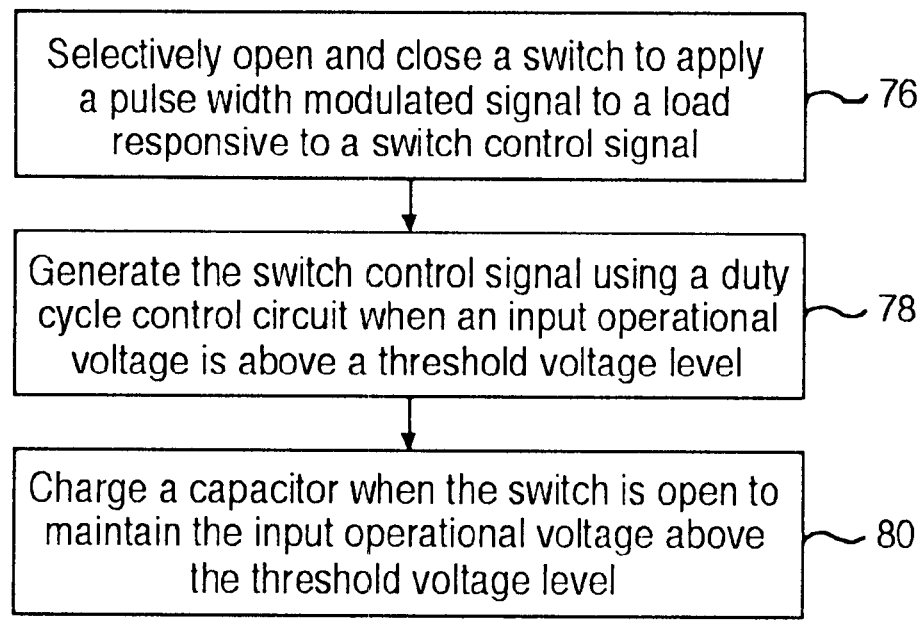
FIG. 8 is a flow chart illustrating a method for energizing a load in accordance with the present invention.

Referring to FIG. 8, a method for energizing a load 17 in accordance with the present invention is illustrated. The method may be implemented using the pulse width modulated driver 20. The inventive method includes a step 76 of selectively opening and closing the switch 28 to apply a pulse width modulated signal $V_{PWM}$ to the load 17 responsive to a switch control signal $V_S$. The step 76 may include a substep of varying a duty cycle of the pulse width modulated signal $V_{PWM}$ responsive to the supply voltage $V_{CC}$. The method may further include a step 78 of generating the switch control signal $V_S$ using a duty cycle control circuit 26 when an input operational voltage $V_o$ is above a threshold voltage level. The step 78 may include a substep of limiting the switch control signal $V_S$ to a predetermined voltage level to thereby limit a current flowing through the switch 28 to the load 17. Finally, the method may include a step 80 of charging a capacitor 38 when the switch 28 is open to maintain the input operational voltage $V_o$ above the threshold voltage level.

Figure 5:
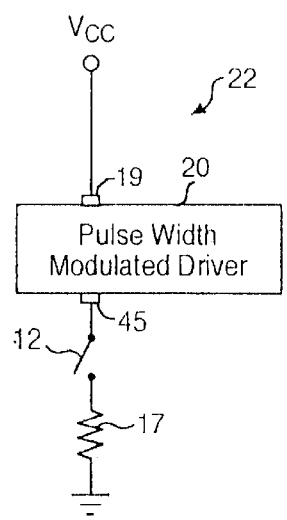
FIG. 5 is a schematic and block diagram illustrating a control circuit in accordance with a second embodiment of the present invention utilizing an inventive pulse width modulated driver.

Referring to FIG. 5, a control circuit 22 in accordance with a second embodiment of the present invention is illustrated. The control circuit 22 is configured substantially the same as the control circuit 18, except that the switch 12 is connected in series between the driver 20 and the load 17 instead of being connected in series between the supply voltage $V_{CC}$ and the driver 20. Further, the control circuit 22 operates substantially the same as the control circuit 18.

Figure 6:
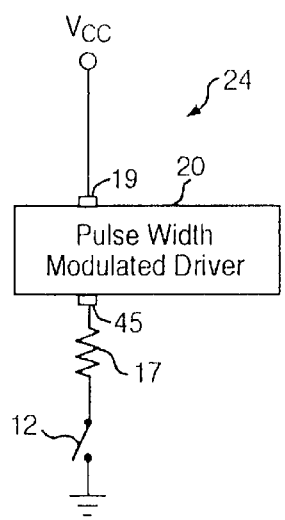
FIG. 6 is a schematic and block diagram illustrating a control circuit in accordance with a third embodiment of the present invention utilizing an inventive pulse width modulated driver.

Referring to FIG. 6, a control circuit 24 in accordance with a third embodiment of the present invention is illustrated. The control circuit 24 is configured substantially the same as the control circuit 18, except that the switch 12 is connected in series between the load 17 and system ground instead of being connected in series between the supply voltage $V_{CC}$ and the driver 20. Further, the control circuit 24 operates substantially the same as the control circuit 18.

The inventive control circuits 18, 22, 24 and the pulse width modulated driver 20 utilized therein represent a significant improvement over conventional control circuits and pulse width modulated drivers. In particular, the circuits 18, 22, 24 allow a conventional halogen bulb 17 to be utilized in a 42 Vdc electrical system of an automotive vehicle. Thus, specially manufactured halogen bulbs (with 42 Vdc filaments) are not needed in an automotive vehicle resulting in decreased component costs. Further, when the inventive driver 20 is utilized as a high side voltage driver (i.e., when the load is connected between the driver and system ground), the driver 20 does not require a separate electrical line connected to system ground. Thus, the driver 20 provides for decreased wiring and manufacturing costs associated with an automotive electrical system.

While the invention has been particularly shown and described with reference to the preferred embodiments thereof, it is well understood by those skilled in the art that various changes and modifications can be made in the invention without departing from the spirit and the scope of the invention.

I claim:

1. A pulse width modulated driver for applying a pulse width modulated signal to a high voltage end of a load, comprising:

a switch selectively opening and closing to apply said pulse width modulated signal to said high voltage end of said load, said switching being responsive to a switch control signal;

a duty cycle control circuit generating said switch control signal only when an input operational voltage is above a threshold voltage level; and, an energy storage circuit for storing electrical energy when said switch is open to maintain said input operational voltage above said threshold voltage level.

2. The pulse width modulated driver of claim 1 wherein said switch is a transistor.

3. The pulse width modulated driver of claim 2 wherein said transistor is connected between a supply voltage and said load, said load being further connected to ground.

4. The pulse width modulated driver of claim 2 further comprising a clamping circuit that limits the switch control signal to a predetermined voltage level to thereby limit the amount of current flowing through said transistor to said load.

5. The pulse width modulated driver of claim 1 wherein said duty cycle control circuit includes an oscillator that generates said switch control signal.

6. The pulse width modulated driver of claim 1 wherein said duty cycle control circuit is further configured to vary the duty cycle of the pulse width modulated signal responsive to a supply voltage.

7. The pulse width modulated driver of claim 1 wherein said energy storage circuit includes a voltage regulator connected to a capacitor, said voltage regulator charging said capacitor when said switch opens to maintain said input operational voltage above said threshold voltage level.

8. The pulse width modulated driver of claim 7 wherein said capacitor operates as a charge pump when said switch closes to maintain said input operational voltage above said threshold voltage level.

9. A control circuit for applying a pulse width modulated signal to a high voltage end of a load, comprising:
   a first switch;
   a pulse width modulated driver connected in series with said first switch and said load; said driver having
      a. a second switch selectively opening and closing to apply said pulse width modulated signal to said high voltage end of said load, said second switch opening and closing responsive to a switch control signal;
      b. a duty cycle control circuit generating said switch control signal only when an input operational voltage is above a threshold voltage level; and,
      c. an energy storage circuit for storing electrical energy when said first switch is closed and said second switch is open to maintain said input operational voltage above said threshold voltage level.

10. The control circuit of claim 9 wherein said first switch is connected in series between a supply voltage and said pulse width modulated driver, and said load being connected in series between said pulse width modulated driver and ground.

11. The control circuit of claim 9 wherein said pulse width modulated driver is connected in series between a supply voltage and said first switch, and said load being connected in series between said first switch and ground.

12. The control circuit of claim 9 wherein said pulse width modulated driver is connected in series between a supply voltage and said load, and said first switch being connected in series between said load and ground.

13. The control circuit of claim 9 wherein said second switch of said pulse width modulated driver is a transistor.

14. The control circuit of claim 13 wherein said pulse width modulated driver further includes a clamping circuit that limits the switch control signal to a predetermined voltage level to thereby limit the amount of current flowing through said transistor to said load.

15. The control circuit of claim 9 wherein said duty cycle control circuit of said pulse width modulated driver includes an oscillator that generates said switch control signal.

16. The control circuit of claim 9 wherein said duty cycle control circuit of said pulse width modulated driver is further configured to vary the duty cycle of the pulse width modulated signal responsive to a voltage level of a supply voltage.

17. The control circuit of claim 9 wherein said energy storage circuit includes a voltage regulator connected to a capacitor, said regulator charging said capacitor when said second switch opens to maintain said input operational voltage above said threshold voltage level.

18. A control circuit for applying a pulse width modulated signal to a high voltage end of a load, comprising:
    a load having first and second ends, said second end being connected to ground, and,
    a pulse width modulated driver having an input terminal and a floating voltage output terminal, said input terminal receiving a supply voltage, said output terminal of said driver being connected to said first end of said load, said driver generating said pulse width modulated signal at said floating voltage output terminal, wherein said driver is not electrically connected to said ground.

19. A method of energizing a load, said load having first and second ends, said first end being connected in series to a switch, said second end being connected to ground, said method comprising the steps of:
    selectively opening and closing said switch to apply a pulse width modulated signal to said load responsive to a switch control signal;
    generating said switch control signal using a duty cycle control circuit only when an input operational voltage is above a threshold voltage level; and,
    charging a capacitor when said switch is open to maintain said input operational voltage above said threshold voltage.

20. The method of claim 19 wherein said step of opening and closing said switch includes a substep of varying a duty cycle of said pulse width modulated signal responsive to a voltage level of a supply voltage.

21. The method of claim 19 wherein said switch comprises a transistor, wherein said generating step includes a substep of limiting said switch control signal to a predetermined voltage level to thereby limit an amount of current flowing through said transistor to said load.

* * * * *